(12) United States Patent
Yu

(10) Patent No.: US 6,168,179 B1
(45) Date of Patent: Jan. 2, 2001

(54) BICYCLE FRAME ASSEMBLY HAVING WOODEN APPEARANCE AND ENHANCED MECHANICAL PROPERTIES

(76) Inventor: Kuo-Pin Yu, No. 6, Lane 477, Sec. 2, Feng-Shyn Rd., Feng Yaun City, Taichung Hsien (TW)

( * ) Notice: Under 35 U.S.C. 154(b), the term of this patent shall be extended for 0 days.

(21) Appl. No.: 09/302,494

(22) Filed: Apr. 30, 1999

(51) Int. Cl.[7] ............................. B62K 3/04; B62K 19/02; B62K 19/14
(52) U.S. Cl. ........................................ 280/274; 280/281.1
(58) Field of Search ............................. 280/281.1, 288.2, 280/288.3, 274; 296/900; 144/346, 349, 352, 353, 355, 209.1; 156/349; 428/411.1

(56) References Cited

U.S. PATENT DOCUMENTS

| | | | |
|---|---|---|---|
| 581,973 | * 5/1897 | York | 280/281.1 |
| 616,681 | * 12/1898 | Miltmore | 280/281.1 |
| 792,005 | * 6/1905 | Coburn . | |
| 1,894,341 | * 1/1933 | Becker . | |
| 2,370,726 | * 3/1945 | Hess et al. | 280/281.1 |
| 3,956,542 | * 5/1976 | Roberti | 428/35 |
| 4,047,731 | * 9/1977 | VanAuken | 280/281.1 |
| 5,271,784 | * 12/1993 | Chen et al. | 280/288.3 |

FOREIGN PATENT DOCUMENTS

419255 * 12/1910 (FR) ................................ 280/281.1

* cited by examiner

Primary Examiner—Anne Marie Boehler
(74) Attorney, Agent, or Firm—Browdy and Neimark

(57) ABSTRACT

A bicycle frame assembly comprises a main frame formed of a plurality of tubular bodies, a front fork, and a handlebar. The tubular bodies of the main frame, the front fork and the handlebar are partially or entirely covered with a wooden layer formed of a wood or bamboo film. The wooden layer is covered with a protective layer of a glass fiber material preimpregnated with epoxy resin.

8 Claims, 7 Drawing Sheets

BICYCLE FRAME ASSEMBLY HAVING WOODEN APPEARANCE AND ENHANCED MECHANICAL PROPERTIES

FIELD OF THE INVENTION

The present invention relates generally to a bicycle frame assembly, and more particularly to a bicycle frame assembly which looks like wood and which has a plurality of outstanding mechanical properties.

BACKGROUND OF THE INVENTION

The conventional bicycle frame made of a metal material is relatively heavy and can not be thus transported conveniently. The advanced bicycle frame is generally made of a carbon fiber composite material, a boron fiber composite material, etc., and is therefore relatively light in weight. In order to provide a bicyclist with a comfortable ride, especially on a bumpy road, the bicycle makers have made a great deal of effort to improve the shock-absorbing quality of the bicycle frame.

Generally speaking, the conventional bicycle frames of a metal or composite material have a frigid and monotonous appearance which is prone to undermine the sense perception of the bicyclist. In addition, conventional bicycle frames are made of fiber composite material impregnated with resin and are therefore inclined to produce static electrical charges resulting from friction.

SUMMARY OF THE INVENTION

It is therefore the primary objective of the present invention to provide a bicycle frame assembly with a wooden look, enhanced mechanical properties, and a user-friendly profile.

It is another objective of the present invention to provide a bicycle frame assembly incapable of producing static electricity.

It is still another objective of the present invention to provide a bicycle frame assembly capable of absorbing shock.

In keeping with the principle of the present invention, the foregoing objectives of the present invention are attained by a bicycle frame assembly comprising a main frame, a front fork, and a handlebar. The frame is formed of a cross tube, a seat tube, a down tube, an upper rear fork, a lower rear fork, a head tube, and a top tube. The front fork is fastened pivotally with the head tube of the main frame by a head bowl set. The handlebar is of a solid or hollow construction and is fastened pivotally with the head tube by a stem. All component parts of the bicycle frame assembly are covered with a wooden layer for enhancing the mechanical properties and the wooden look of the bicycle frame assembly.

The foregoing objectives, features, functions, and advantages of the present invention will be more readily understood upon a thoughtful deliberation of the following detailed description of the embodiments of the present invention with reference to the accompanying drawings.

DETAILED DESCRIPTION OF THE INVENTION

Figure 1:
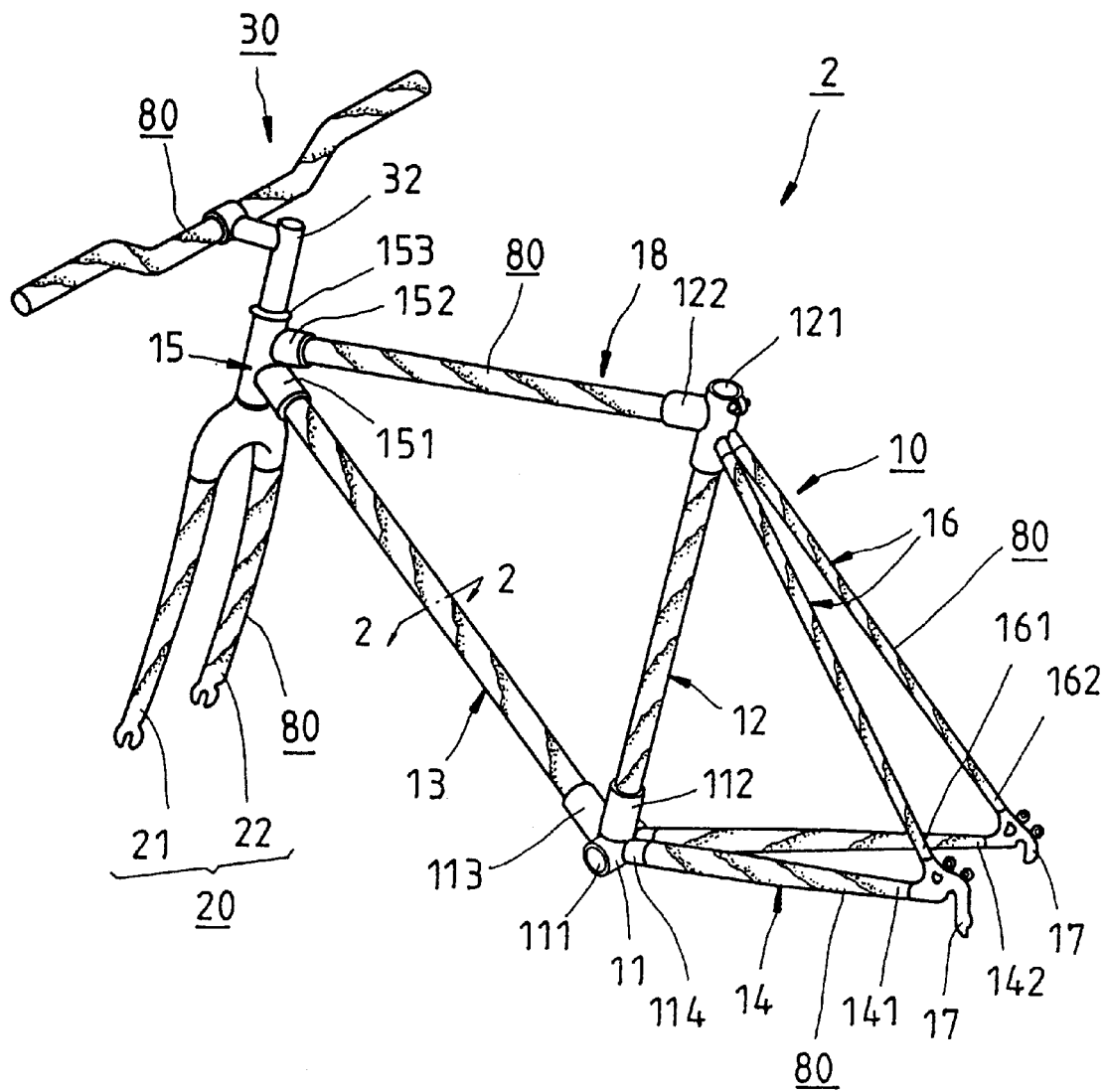
FIG. 1 shows a perspective view of a bicycle frame assembly of the present invention.
Figure 2:
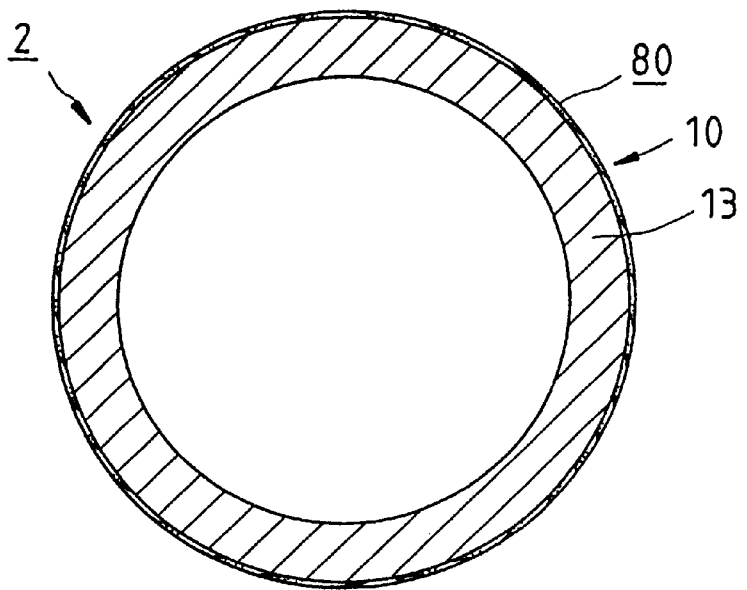
FIG. 2 shows a sectional view taken along a line 2—2 as shown in FIG. 1.

As shown in FIGS. 1 and 2, a bicycle frame assembly 2 embodied in the present invention comprises a main frame 10, a front fork 20, and a handlebar 30.

The main frame 10 is formed of a cross tube 11 having an axial through hole 111 for mounting a crank axle (not shown in the drawings). The cross tube 11 is fastened with a seat tube 12 by a joint 112. The seat tube 12 is provided with an axial hole 121 for receiving a seat post (not shown in the drawings). The cross tube 11 is further fastened with a down tube 13 and a lower rear fork 14 by the joints 113 and 114. The down tube 13 is fastened at other end thereof with a joint 151 of a head tube 15 having an axial fitting hole 153 for mounting a head bowl set (not shown in the drawings) and the front fork 20. The lower rear fork 14 has two branches 141 and 142, which are connected respectively with two branches 161 and 162 of a upper rear fork 16 to form two lower fork ends 17 for fastening the bicycle hub (not shown in the drawings). The head tube 15 and the seat tube 12 are fastened with the top tube 18 by the joints 152 and 122. The upper rear fork 16 is fastened with the seat tube 12. The tubes of the main frame 10 are made of a fiber-reinforced plastic material, a carbon fiber preimpregnated with epoxy resin, a glass fiber, a boron fiber, a metal material, a steel or aluminium alloy material, etc.

The front fork 20 is fastened pivotally with the fitting hole 153 of the head tube 15 by the head bowl set and is provided with two branches 21 and 22 for mounting a front wheel. The front fork 20 is made of a material which is similar to the material of which the main frame 10 is made.

The handlebar 30 is of a solid or hollow construction and is fastened pivotally with the head tube 15 by a stem 32. The handlebar 30 is made of a material similar to the material of which the main frame 10 and the front fork 20 are made.

The present invention is characterized by the bicycle frame assembly 2 which is covered with a wooden layer 80 which is made of a film of wood or bamboo.

Figure 3:
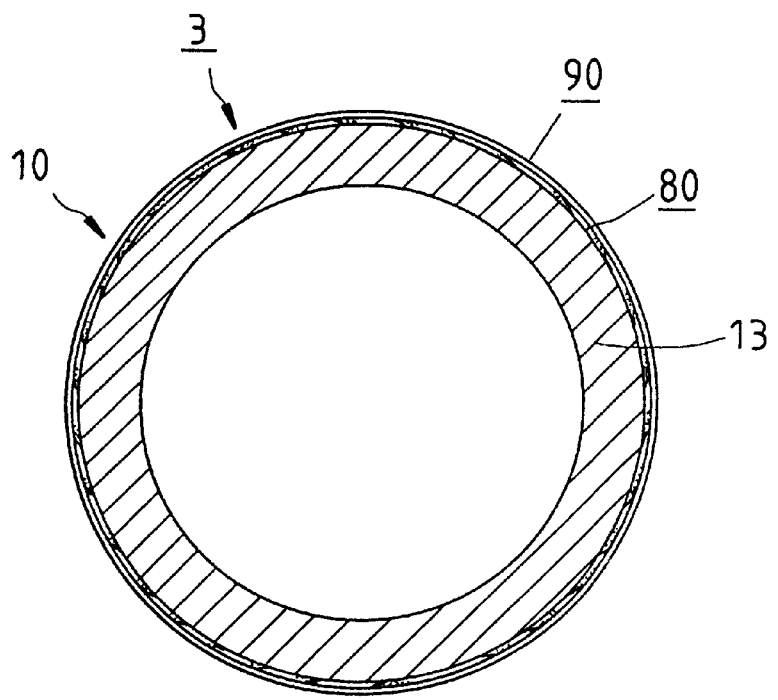
FIG. 3 shows a sectional view of the present invention.
Figure 4:
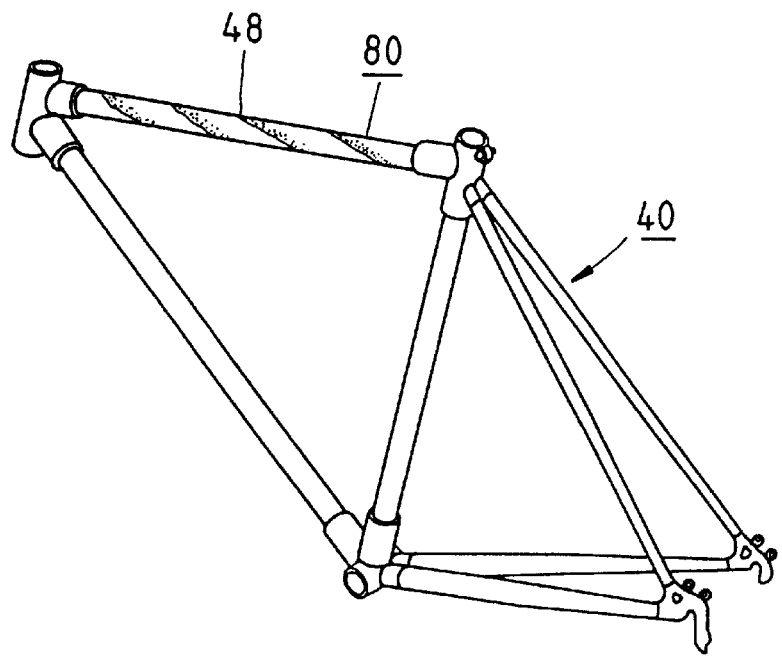
FIGS. 4–13 are perspective views of the bicycle frame assemblies embodied in the present invention.

As shown in FIG. 3, the wooden layer 80 of a bicycle frame assembly 3 of another preferred embodiment of the present invention is covered with a protective layer 90 which is made of a glass fiber material preimpregnated with epoxy resin.

Figure 5:
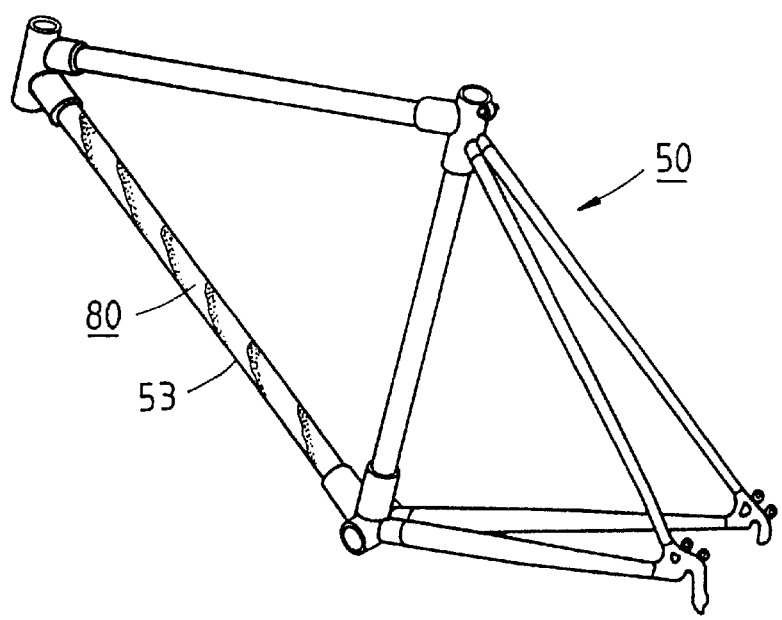
Figure 6:
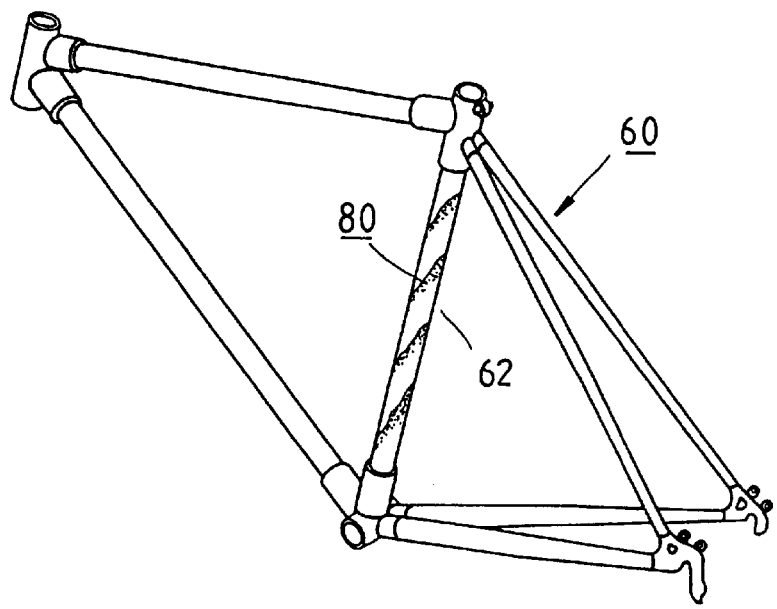
Figure 7:
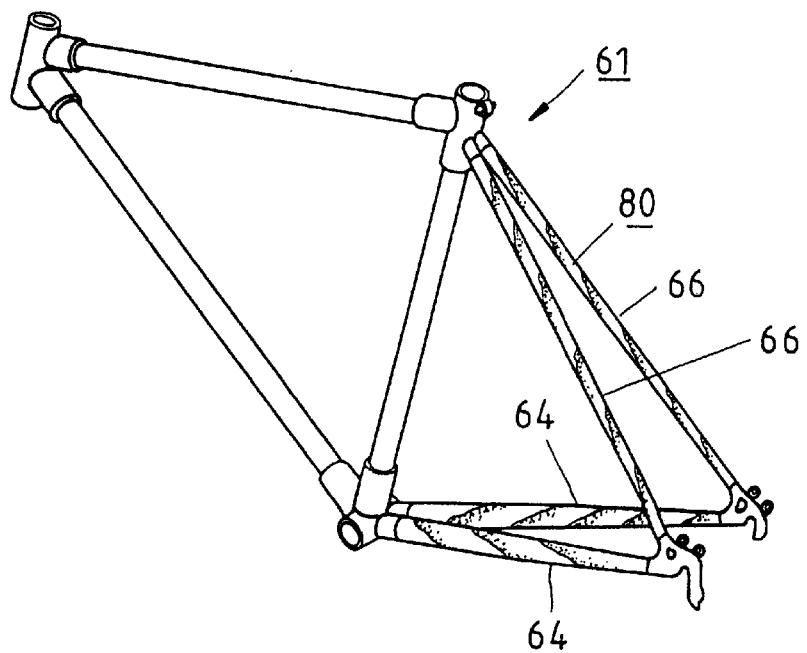

The bicycle frame assembly of the present invention may be partially covered with the wooden layer 80. For example, only the top tube 48 of the main frame 40 is covered with the wooden layer 80, as shown in FIG. 5. The seat tube 62 of the main frame 60 is covered with the wooden layer 80, as shown in FIG. 6. As shown in FIG. 7, the wooden layers 80 of the lower rear fork 64 and the upper rear fork 66 are covered with the protective layer 90 of the glass fiber material.

Figure 8:
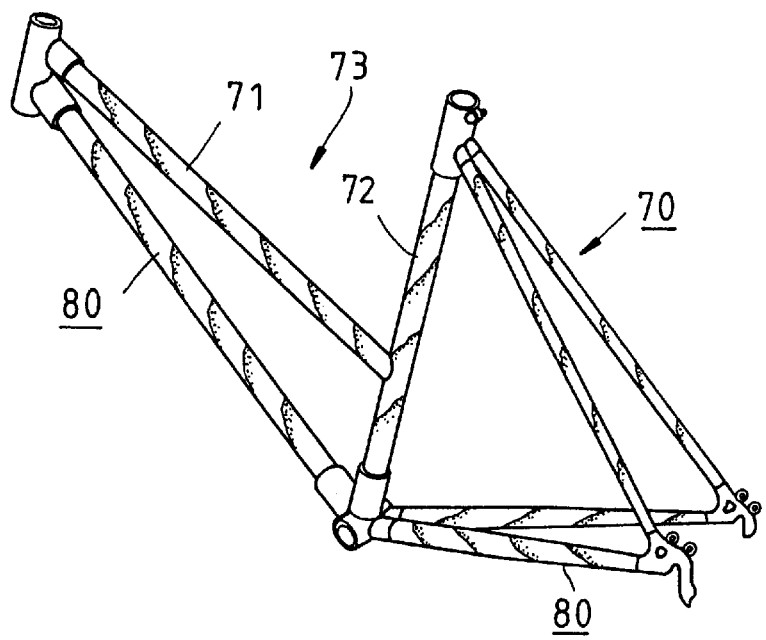

As shown in FIG. 8, the fastening portion of the top tube 71 and the seat tube 72 of the main frame 70 is located under the seat tube 72 so as to form a space 73 to facilitate the riding of the bicycle by a woman wearing a skirt. The main frame 70 is partially covered with the wooden layer 80, as well as the protective layer 90.

Figure 9:
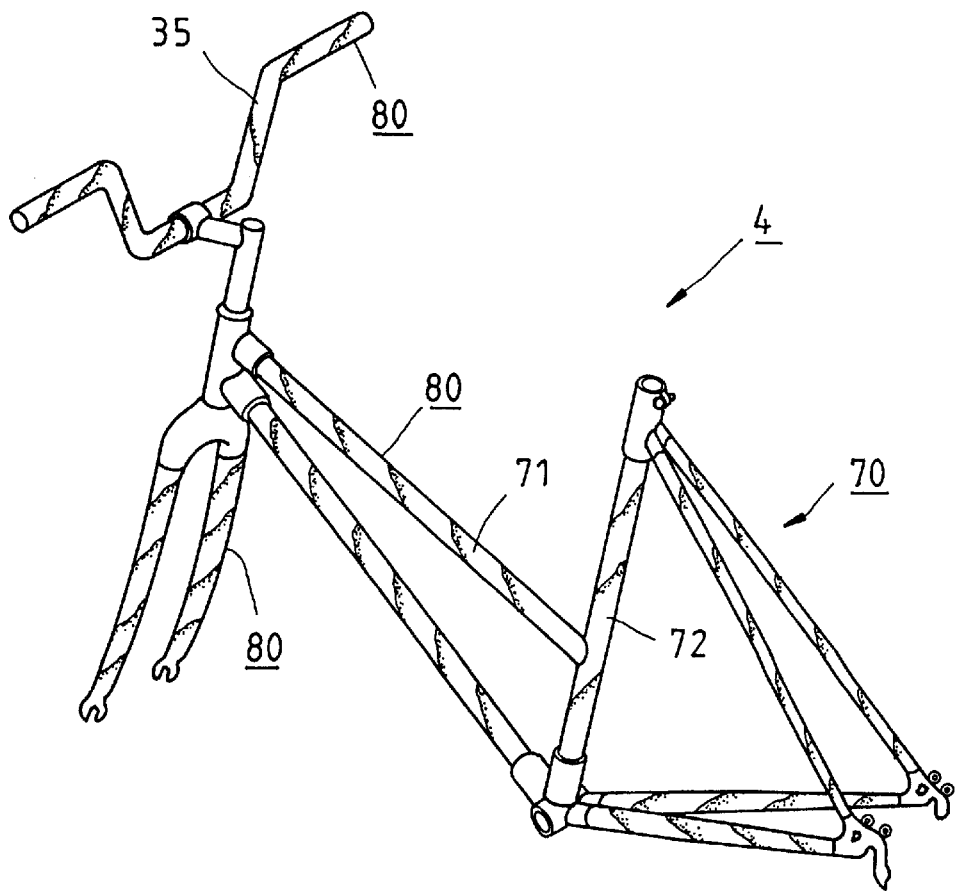

As shown in FIG. 9, the handlebar 35 is covered with the wooden layer 80.

Figure 10:
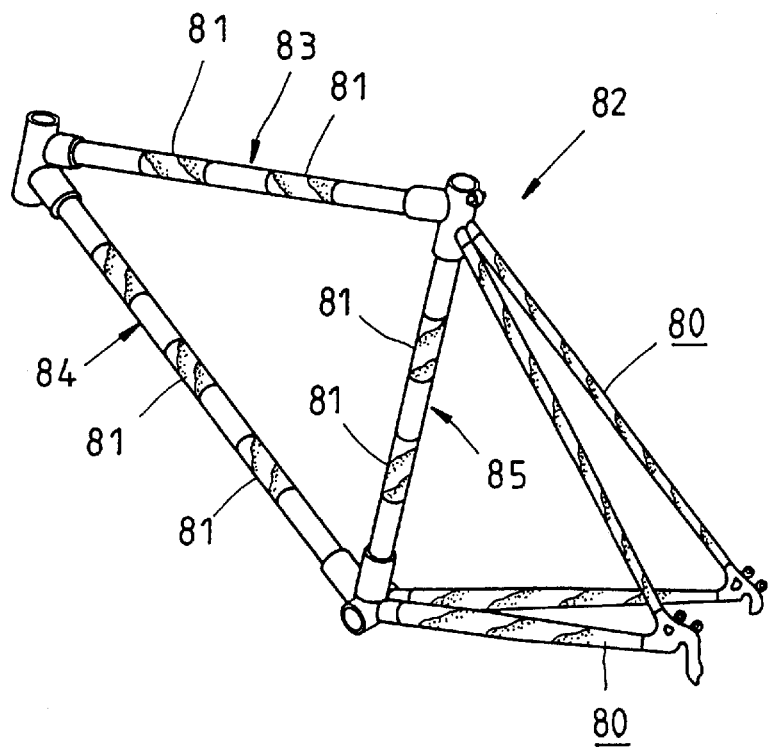
Figure 11:
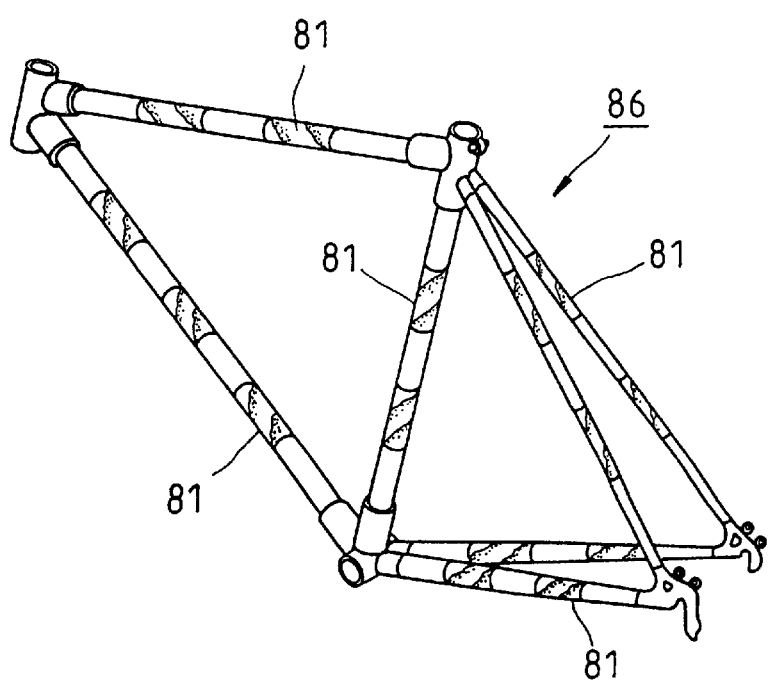

As shown in FIGS. 10 and 11, the top tube 83, the down tube 84 and the seat tube 85 of the main frame 82 are covered with the segmented wooden layer 81. The main frame 86 is entirely covered with the segmented wooden layer 81.

Figure 12:
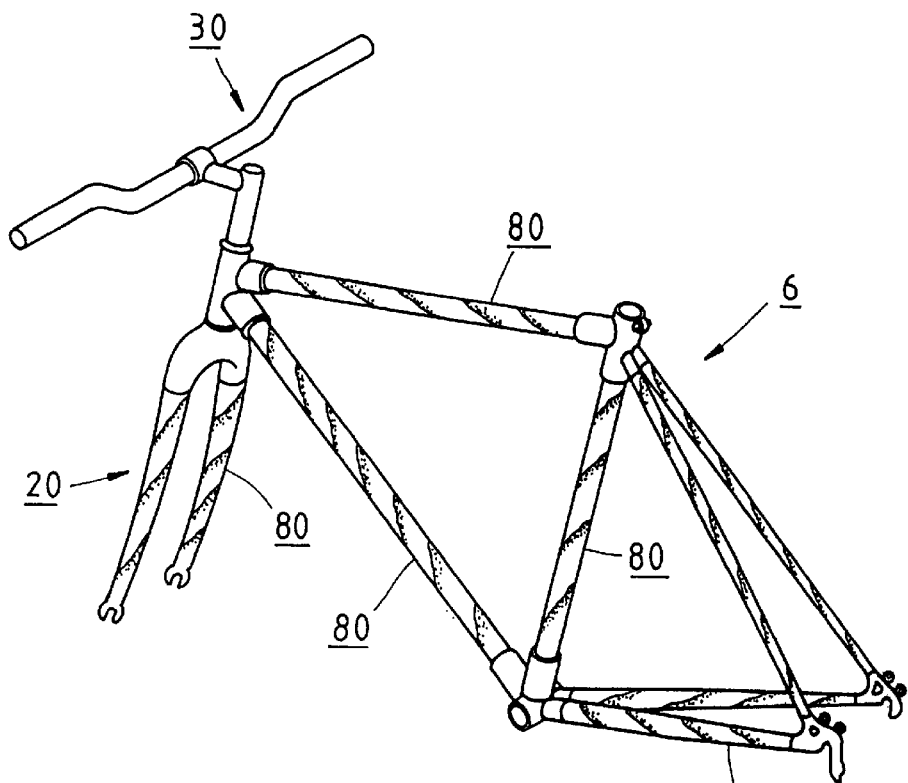
Figure 13:
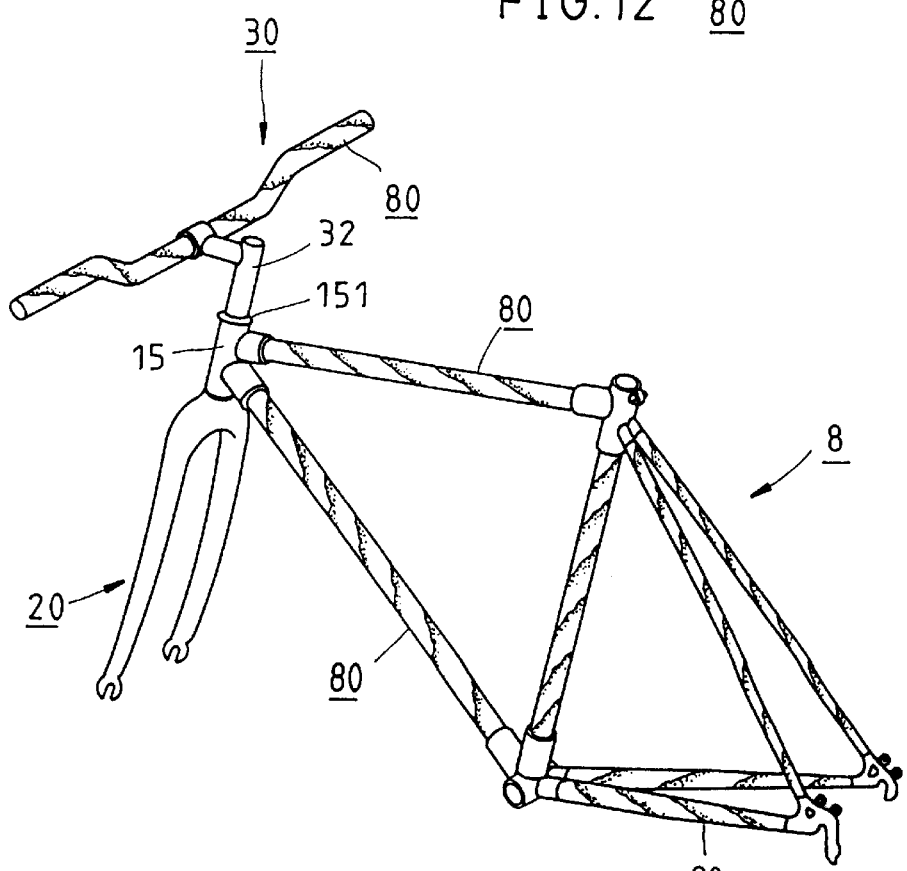

As shown in FIGS. 12 and 13, only the front fork 20 or the handlebar 30 is covered with the wooden layer 80, which may be covered with the protective layer 90.

The wooden layer 80 is capable of absorbing shock, so as to give an added comfort to the riding of the bicycle by a bicyclist. In addition, the wooden layer and the fiber-reinforced plastic material of which the assembly of the present invention is made give an added strength to the structure of the bicycle. The assembly of the present invention enhances the sense perception of a bicyclist. The wooden layer 80 and the protective layer 90 of the present invention prevent the asembly of the present invention from producing static electricity.

What is claimed is:

1. A bicycle frame assembly comprising:
   a main frame formed of a cross tube, a seat tube fastened with said cross tube, a lower rear fork fastened with said cross tube, a head tube fastened with said down tube, an upper rear fork fastened with said seat tube, a top tube fastened with said head tube and said seat tube, a seat post received in said seat tube, and two rear fork ends formed by two branches of said lower rear fork and said upper rear fork for fastening a hub;
   a front fork fastened pivotally with said head tube by a head bowl set and provided with two branches for mounting a front wheel; and
   a handlebar fastened pivotally with said head tube by a stem;
   wherein said tubes of said main frame, said front fork, and said handlebar are made of a material selected from the group consisting of fiber reinforced plastic materials, carbon fibers preimpregnated with epoxy resin, glass fibers, boron fibers and metal materials having a rigidity and are covered with a layer of wood.

2. The bicycle frame assembly as defined in claim 1, wherein said metal material is a steel or aluminum alloy.

3. The bicycle frame assembly as defined in claim 1, wherein said layer of wood is covered with a protective layer of a glass fiber material preimpregnated with epoxy resin.

4. A bicycle frame assembly comprising:
   a main frame formed of a cross tube, a seat tube fastened with said cross tube, a down tube fastened with said cross tube, a lower rear fork fastened with said cross tube, a head tube fastened with said down tube, an upper rear fork fastened with said seat tube, a top tube fastened with said head tube and said seat tube, a seat post received in said seat tube, and two rear fork ends formed by two branches of said lower rear fork and said upper rear fork for fastening a hub;
   a front fork fastened pivotally with said head tube by a head bowl set and provided with two branches for mounting a front wheel; and
   a handlebar fastened pivotally with said head tube by a stem;
   wherein said main frame, said front fork and said handlebar are partially covered with a layer of wood; and wherein said main frame, said front fork and said handlebar are made of a material having a rigidity selected from the group consisting of fiber reinforced plastic materials, glass fibers, boron fibers, carbon fibers preimpregnated with epoxy resin, and metal materials.

5. The bicycle frame assembly as defined in claim 4, wherein said material is a fiber-reinforced plastic material.

6. The bicycle frame assembly as defined in claim 4, wherein said metal material is a steel or aluminum alloy.

7. The bicycle frame assembly as defined in claim 4, wherein said layer of wood is covered with a protective layer of a glass fiber material preimpregnated with epoxy resin.

8. The bicycle frame assembly as defined in claim 4, wherein said layer of wood is segmented.

* * * * *